Patented Apr. 27, 1937

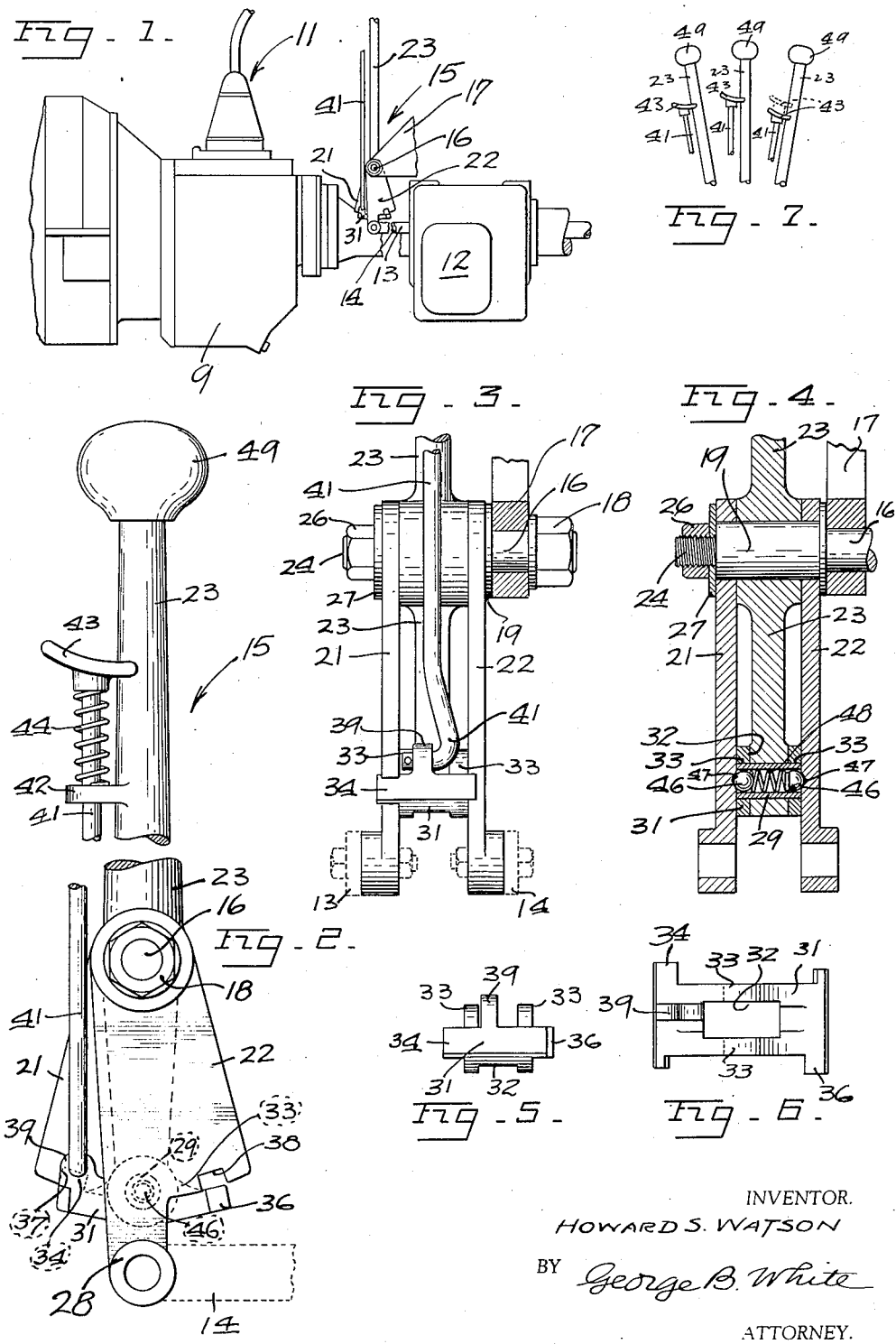

2,078,474

UNITED STATES PATENT OFFICE 2,078,474

TRANSMISSION SHIFTING MECHANISM

Howard S. Watson, San Francisco, Calif.

Application October 29, 1935, Serial No. 47,230

4 Claims. (Cl. 74—475)

This invention relates to a shifting mechanism, such as a gear shifting mechanism for auxiliary change speed transmission gearing.

The primary object of the invention is to provide a shifting mechanism whereby the gears of a change speed transmission gearing can be shifted without necessitating any lateral selective movement of the shift lever of said mechanism.

Another object of the invention is to provide a shifting mechanism for an auxiliary transmission which can be economically and speedily installed in a motor vehicle, and which is simple, light and easy to assemble and connect.

Another object of this invention is to provide a shifting mechanism which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description and specifically pointed out in the appended claims, reference is had to the accompanying drawing for the illustrative embodiment of the invention, wherein:

Figure 1 is a somewhat diagrammatic view of my shifting mechanism installed between a main transmission and an auxiliary transmission.

Figure 2 is a side view of my shifting mechanism.

Figure 3 is a fragmental front view of the shifting mechanism partly in section.

Figure 4 is a fragmental sectional view of the shifting mechanism.

Figure 5 is a detail end view of the latch of the shifting mechanism.

Figure 6 is a top plan view of said latch, and

Figure 7 is a diagrammatic view of the positions of the shift lever in various drive positions.

In ordinary transmissions for motor vehicles or the like provision is made for three or four forward speeds and one reverse. The standard gear ratios of the usual transmissions are well adapted to average conditions. However the situation frequently arises, especially in connection with commercial vehicles, such as trucks and busses and the like, where many additional gear ratios are needed. To accomplish such additional gear ratios auxiliary transmissions are installed which are usually mounted behind the main transmission. The auxiliary transmission can be shifted to various gear ratios which complement and modify all the gear ratios or speed of the main transmission, so as to produce for each main gear ratio either a so called overdrive, or underdrive, or direct drive ratio before the driving force is transmitted to the propeller or drive shaft or a like driven element.

In the herein illustration the main change speed transmission 9 can be shifted by the usual gear shift mechanism and lever 11. The auxiliary change speed transmission 12 is herein shown with two shifting members such as the bars or links 13 and 14 for shifting the gears of the auxiliary transmission 12.

The auxiliary transmission 12 has its own shifting mechanism and gear shift lever. But heretofore such auxiliary shifting mechanism was mounted on bulky, large castings, and on the transmission casings, so that its installation on a truck or bus presented a difficult problem resulting in waste and expense.

My auxiliary shifting mechanism 15 herein described obviates any difficulty of installation, because it is supported on a single pivot on any stationary member, such as any convenient part of the frame of the vehicle.

In carrying out my invention I make use of a mounting bolt 16. The threaded end of the mounting bolt 16 extends through any suitable support such as a bar or bracket 17 on the vehicle frame. The bolt 16 is clamped on the bracket 17 by means of a suitable nut 18 on one side of the bracket 17 and a collar 19 of the bolt 16 bearing against the other side of the bracket 17. An enlarged portion of the bolt 16 serves as a pivot 19, on which are fulcrumed spaced side plates 21 and 22 and the hub of a shift lever 23 between said plates. The side plates 21 and 22 hang freely from the pivot 19 so as to be swingable independently of each other and of the shift lever 23. The free end of the pivot 19 is threaded as at 24, and a nut 26 and washer 27 bearing against the adjacent shoulder of the pivot 19 hold said plates 21 and 22 and the lever 23 in place.

Each of the plates 21 and 22 is preferably formed substantially in a half sector shape and are parallel with each other with the inclined sides extending in opposite directions relatively to each other. Vertical ears 28 extend downwardly from said plates 21 and 22 in line with the lower portion of the shift lever 23. The shifting bars or links 13 and 14 are suitably connected to the journal ends of the ears 28.

The lower end of the shift lever 23 is spaced above said ears 28 and has a tubular latch pin 29 extended therethrough in substantial parallelism with the pivot 19. The latch pin 29 extends beyond the opposite faces of the end of the lever 23 so as to serve as a pivot or fulcrum for a latch 31. The latch 31 is a substantially arcuate plate with a central aperture 32 that fits over the end of the lever 23. The latch 31 fits into the space between the side plates 21 and 22 and the end of the lever 23, as shown in Figure 4. On the opposite sides of the aperture 32 are bearings 33 in which the ends of the latch pin 29 are journaled. Thus the latch 31 can be rocked around the latch pin 29 as a fulcrum.

On the opposite ends of the latch 31 are laterally extended engagement abutments or lugs 34 and 36, which extend from the opposite edges of the latch 31 and below the arcuate lower edges of the respective side plates 21 and 22. In the lower edges of the side plates 21 and 22 are cut notches 37 and 38 respectively adapted to be engaged by the lugs 34 and 36 of the latch 31.

In an ear 39 on the top of the latch 31 adjacent the side plate 21 is held the hooked end of a latchrod 41 which then extends upwardly alongside the shift lever 23. The latch rod 41 slidably extends through a guide 42 on one side of the shift lever 23 and terminates in a button 43. A coil spring 44 around the latch rod 41 and between the guide 42 and the button 43 normally urges the latchrod 41 upwardly so that the latch lug 34 is engaged with the notch 37 of the plate 21.

In neutral position the plates 21 and 22 and the lever 23 hang parallel with each other. Said plates 21 and 22 are further held in the neutral position by means of latch balls 46, one in each end of the tubular latch pin 29. A latch spring 48 between the latchballs 46 yieldably urges the latch balls 46 apart from each other and into aligned indentations 47 in the adjacent faces of the plates 21 and 22.

It is to be noted that the upper end of the lever 23 terminates in a usual knob 49.

In operation the usual shifting elements 13 and 14 and the auxiliary transmission 12 offer sufficient resistance to prevent accidental shifting movement of the plates 21 and 22 unless the latter are moved directly by the shift lever 23. At any speed ratio of the main transmission 9 a so-called overdrive ratio may be accomplished by pushing the upper end of the lever 23 forwardly, as shown in the first position in Figure 7. The second or middle position of the lever 23 in Figure 7 is the neutral position.

Inasmuch as the plate 21 is normally connected to the lever 23 by the latch 31, the forward moving of the knob 49 will rock the plate 21 rearwardly in unison with the lower end of the lever 23 thereby shifting the bar or link 13 rearwardly. The rearward pulling of the knob 49 causes the forward swinging of the plate 21 in unison with the lower end of the lever 23 thereby shifting the bar or link 13 forwardly. This is illustrated in the third position of the lever 23 in Figure 7, and corresponds to a direct drive shift of the auxiliary transmission. However if the latch rod button 43 is depressed while the lever 23 is in neutral position, then the latch rod 41 rocks the latch 31 so as to disengage the lug 34 from the notch 37 in the plate 21 and to engage the other lug 36 with the notch 38 of the other side plate 22. If the knob 49 is now pulled rearwardly with the latch button 43 held depressed, as shown in full lines in the third position in Figure 7, then the side plate 22 is moved forwardly in unison with the lower end of the lever 23 so as to shift the other bar or link 14 forwardly. This last mentioned shifting corresponds to a so-called underdrive gear ratio of the auxiliary transmission.

Consequently, the embodiment of my invention, herein shown is capable of shifting the auxiliary mechanism into an overdrive or direct drive ratio by merely rocking the knob 49 and the upper portion of the shift lever 23 respectively forward or rearward with the side plate 21 connected to the lower end of the lever 23. But the shift lever 23 may be selectively connected to the other side plate 22 by depressing the button 43 to rock the latch 31 and then a rearward pull of the knob 49 of the shift lever 23 acomplishes the shifting into the third, namely the underdrive ratio. Either side plate may be selectively connected with the shift lever 23 by rocking the latch 31 in opposite directions. Hence three speeds can be obtained without any sidewise or lateral shifting of the shift lever 23. In case of auxiliary transmission, these three speeds are additional speed ratios in combination with any of the speed ratios of the main transmission.

The assembling and installation of the shifting mechanism heretofore described is convenient and easy, because it may be mounted as a separate unit on any stationary part of a vehicle. This shifting mechanism is entirely independent from both the main transmission and the auxiliary transmission with respect to mounting and installation, because it can be readily connected to the shiftable elements of the auxiliary transmission by any suitable links. The use of my device therefore also facilitates the installation of the auxiliary transmission, because the latter is not governed by considerations for a convenient location for its shifting mechanism, as in the past.

Having thus described my invention what I claim and desire to secure by Letters Patent is:

1. In a shifting device for change speed mechanisms, the combination with movable elements connected to the change speed mechanism, of a support, a shift lever journalled on said support at a point spaced from both ends of said lever and to be rockable only in one plane, arms journalled on said support, one arm on each side of said lever, so that said arms are rockable in planes parallel with the rocking of said lever, the free end of each arm being connected to one of said movable elements, means on the portion of the lever between said arms being rockable in the plane of the rocking of the lever but substantially at right angles to the fulcrum of the lever to selectively connect one of said arms to said lever, and a mechanism carried by said lever whereby said connecting means can be rocked.

2. In a shifting device for a speed change mechanism, a lever fulcrumed intermediate the ends thereof so as to be rockable in one plane, an arm on each side of said lever being rockable on the same fulcrum as that of the lever and in planes parallel with the plane in which the lever is rockable, each arm being connected to said speed change mechanism, a rocking latch pivoted on said lever between said arms substantially at right angles to the fulcrum of the lever, means on the arms normally aligned with the latch to be selectively engaged by the latch when the latch is rocked in opposite directions around its fulcrum, and means carried by said lever for rocking said latch.

3. In a shifting device for a speed change mechanism, a lever fulcrumed intermediate the ends thereof so as to be rockable in one plane, an arm on each side of said lever being rockable on the same fulcrum as that of the lever and in planes parallel with the plane in which the lever is rockable, each arm being connected to said speed change mechanism, a rocking latch pivoted on said lever between said arms substantially at right angles to the fulcrum of the lever, a lateral abutment adjacent each end of the latch, a notched extension on each arm being extended in opposite directions to each other in registry with said abutments, means carried by said lever to normally urge said latch into a position to engage one of said abutments with one of said notched extensions, said means being adjustable to rock the latch so as to disengage said latch from said first arm and to move the other abutment of the latch into engagement with the notched extension of the other arm.

4. In shifting means for speed change mechanisms the combination with shifting elements extended from said mechanism, a shifting lever, and a downwardly extending rockable plate on each side of said shifting lever, of a supporting pivot to form the common fulcrum of a said lever and said plates, a portion of said lever extending beyond said fulcrum and between said plates, an element rockable on the end of said portion of said lever around a fulcrum on said lever substantially parallel with said first fulcrum, said plates having notches thereon, and engagement members on said rockable element adapted to alternately engage the respective notches on said plates as the element is rocked in opposite directions, and means carried by said lever for rocking said element at will.

HOWARD S. WATSON.